United States Patent
Trythall

(10) Patent No.: US 12,026,301 B2
(45) Date of Patent: Jul. 2, 2024

(54) METHOD FOR TRACKING ORIENTATION OF AN OBJECT, TRACKER SYSTEM AND HEAD OR HELMET-MOUNTED DISPLAY

(71) Applicant: BAE SYSTEMS plc, London (GB)

(72) Inventor: Simon Trythall, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/044,291

(22) PCT Filed: Sep. 8, 2021

(86) PCT No.: PCT/GB2021/052310
§ 371 (c)(1),
(2) Date: Mar. 7, 2023

(87) PCT Pub. No.: WO2022/053795
PCT Pub. Date: Mar. 17, 2022

(65) Prior Publication Data
US 2023/0333634 A1  Oct. 19, 2023

(30) Foreign Application Priority Data

Sep. 10, 2020 (EP) .................................. 20275140
Sep. 10, 2020 (GB) .................................. 2014242

(51) Int. Cl.
*G06F 3/01* (2006.01)

(52) U.S. Cl.
CPC .................................. *G06F 3/012* (2013.01)

(58) Field of Classification Search
CPC .............. G06F 3/012; G06F 3/011; G02B 2027/0138; G02B 2027/014; G02B 27/0093; G02B 27/017; G01C 25/005
See application file for complete search history.

(56) References Cited

U.S. PATENT DOCUMENTS 5,742,264 A * 4/1998 Inagaki .................. G09G 5/397
348/E5.145
6,734,834 B1  5/2004 Baram
(Continued)

FOREIGN PATENT DOCUMENTS

JP   2017120441 A   7/2017
JP   2019049831 A   3/2019
(Continued)

OTHER PUBLICATIONS

International Search Report and Written Opinion received for PCT/GB2021/052310, dated Nov. 18, 2021. 10 pages.
(Continued)

*Primary Examiner* — Brent D Castiaux
(74) *Attorney, Agent, or Firm* — Finch & Maloney PLLC

(57) ABSTRACT

There is provided a method for determining an intended orientation and/or position of a user's head when the orientation of the user's head is being changed involuntarily by vibratory or buffeting forces transmitted through the user's body from a point of contact of the user's body with said forces. The method comprising: determining a force variable at the point of contact due to said forces; predicting, using an adaptive filter comprising a first input, a first output, a filter coefficient input, and at least one filter coefficient, an involuntary component of orientation of the user's head at a predetermined time due to the sensed variable, wherein the first output is equal to the involuntary component of orientation and the first input comprises the force variable; determining, using at least one tracking system, an orientation variable of the user's head at the predetermined time; subtracting a first value from a second value, the first value equal to the first output and the second value equal to the orientation variable, to provide a third value equal to the filter coefficient input; and updating the at least one filter coefficient based on the filter coefficient input.

FIG. 2 to be published with the application.

21 Claims, 4 Drawing Sheets

(56) References Cited

U.S. PATENT DOCUMENTS

| | | | | |
|---|---|---|---|---|
| 2004/0051680 | A1* | 3/2004 | Azuma | G06T 19/006 |
| | | | | 345/8 |
| 2013/0293447 | A1* | 11/2013 | Bickerstaff | G02B 27/646 |
| | | | | 345/8 |
| 2015/0294505 | A1 | 10/2015 | Atsmon | |
| 2017/0050743 | A1 | 2/2017 | Cole et al. | |
| 2017/0241799 | A1 | 8/2017 | Yanni | |
| 2018/0025502 | A1 | 1/2018 | Menozzi | |
| 2018/0031849 | A1 | 2/2018 | Omanovic et al. | |

FOREIGN PATENT DOCUMENTS

| | | |
|---|---|---|
| JP | 2019174523 A | 10/2019 |
| WO | 2017/042578 A1 | 3/2017 |
| WO | 2022/053795 A1 | 3/2022 |

OTHER PUBLICATIONS

Extended European Search Report received for EP Application No. 20275140.0, dated Feb. 23, 2021. 7 pages.
Combined Search and Examination Report under Sections 17 and 18(3) received for GB Application No. GB2014242.8, dated Mar. 1, 2021. 8 pages.
Combined Search and Examination Report under Sections 17 and 18(3) received for GB Application No. GB2112758.4, dated Feb. 28, 2022. 10 pages.

* cited by examiner

METHOD FOR TRACKING ORIENTATION OF AN OBJECT, TRACKER SYSTEM AND HEAD OR HELMET-MOUNTED DISPLAY

TECHNICAL FIELD

The present disclosure relates to a method of tracking the orientation of an object, to a tracker system and to a head or helmet-mounted display system.

BACKGROUND

Helmet-Mounted Display (HMD) systems used in aircraft, for example, are arranged to display image artefacts such as symbols overlain over a user's view of the outside world. Such symbols may include markers indicating the position of features on the ground, a horizon line for example, or they may depict cockpit instruments and flight information in a virtual head-up display intended to appear locked in position relative to the cockpit interior.

In one known example, a tracking system is provided to track the orientation of a helmet at all times. The tracked orientation is supplied to a helmet-mounted display system with sufficient frequency to enable the display system to update the position of symbols so as to appear fixed in space irrespective of movement of the user's head.

If a wearer of the helmet is exposed to vibration or buffeting, for example through a seat, resultant sudden movement of the helmet may cause unacceptable instability in the display of symbols that are intended in such display systems to appear fixed in space.

BRIEF DESCRIPTION OF THE DRAWINGS

Example embodiments of the invention will now be described in more detail with reference to the accompanying drawings, of which.

DETAILED DESCRIPTION

Helmet-mounted or head mounted display systems, for example a helmet-mounted display system as described in a patent application by the present applicant and published as WO 2017/042578 A1, rely upon the output of an associated helmet/head tracker system in calculating the position of image artefacts in an image for display. A changing orientation of the helmet/head is determined by the tracker system with a frequency sufficient to enable the display system to update the position of particular symbols, for example a horizon line, so as to appear fixed in space relative to the user's view of the outside world, irrespective of movement of the user's head. In particular, in the system described in WO 2017/042578 A1, the accurate positioning of such symbols in the display relies upon the tracking system predicting the orientation of the helmet a short time after the tracker sensors have provided the data for calculating a latest measure of helmet orientation. This is to ensure that latency in the display system in re-calculating the position of particular symbols, to take account of a change in helmet orientation, does not cause the re-positioning of symbols to appear to lag behind the actual position of the wearer's head.

The prediction functionality in the tracker system can be disrupted by certain random patterns of rapid helmet movement, such as may be caused by vibration of a vehicle in which the wearer is travelling. Vibratory displacements may be transmitted through the user's body to their head, so adding involuntary rotary head movement to any voluntary rotary movement of the wearer's head. The combination of voluntary and involuntary rotary movement is detected by the helmet tracker system sensors and the sensed orientation changes are used by the prediction functionality of the tracker system with undesirable results. A new technique is required to enable the effects of vibration to be mitigated from sensor data to be used in the tracker system to predict helmet orientation intended for use by the associated display system.

It may be thought that one possible solution to such a problem is to reduce the latency in the display system so that every movement, whether involuntary or voluntary, may be taken into account when repositioning symbols in the display. However, the latency of the display system is strongly limited by the technology, including speed of processing and response time of display devices, and is difficult to reduce the levels required to respond accurately to vibratory or buffeting movement.

Figure 1:
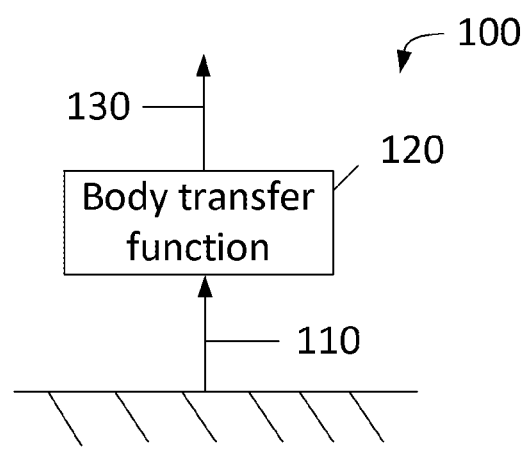
FIG. 1 shows a simplified example of a control system as may be implemented by a tracker system according to the present disclosure.

FIG. 1 illustrates a vibrational system 100. Vibrational system 100 comprises a translation vibration 110 which acts on a body, such as a user on a seat. The body has a body transfer function 120. The body transfer function 120 is the function that when the translation vibration is used as the input, the body transfer function outputs a head angular vibration 130. The body transfer function 120 may depend upon the user, and the properties of the seat. Therefore, a solution to mitigate against the vibrational translation of the user is to attempt to estimate the body transfer function.

Figure 2:
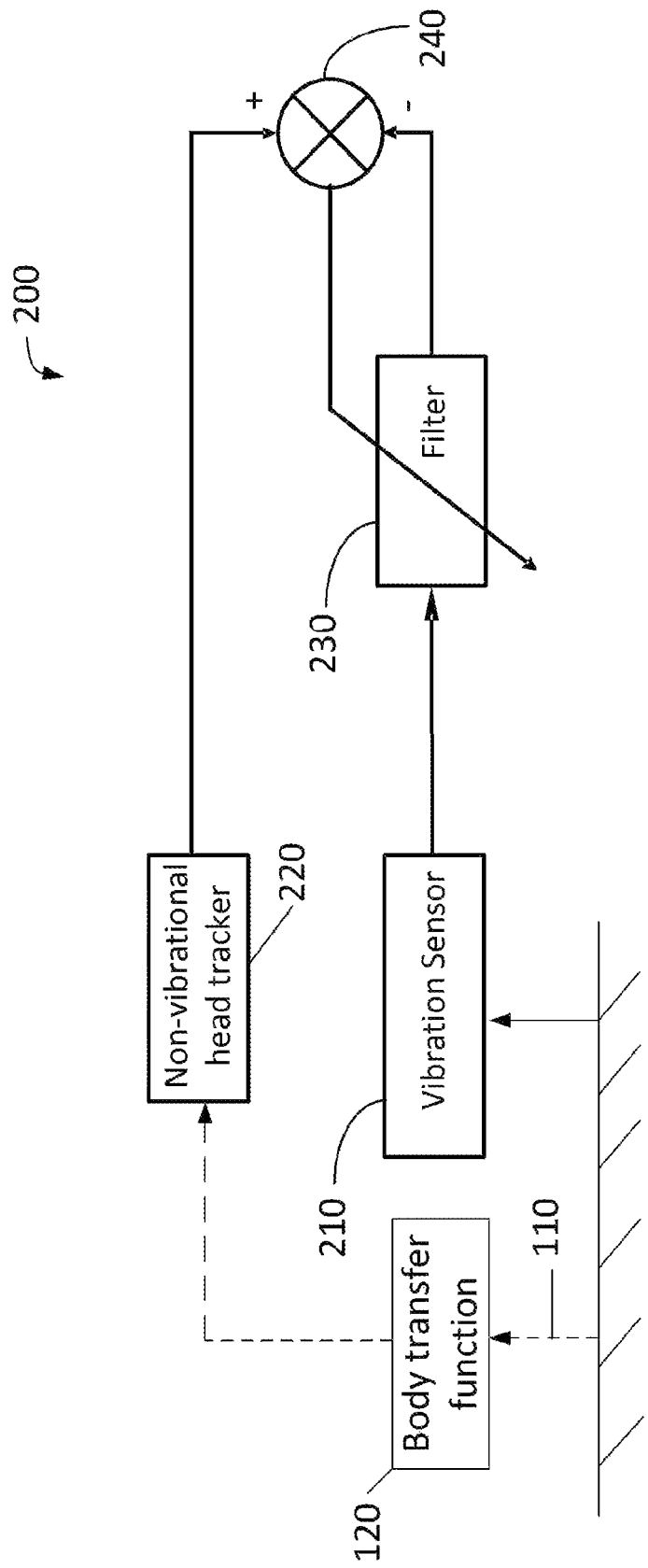
FIG. 2 shows an example arrangement of components as may be incorporated into a tracker system according to the present disclosure.

FIG. 2 illustrates a head tracker system 200 in accordance with some examples. Head tracker system comprises at least one vibration sensor 210, a non-vibrational head tracker 220, and an adaptive filter 230.

A vibration of a platform causes vibration of the user which may be determined by the at least one vibration sensor 210. The vibration sensor 210 outputs a force variable. The at least one vibration sensor 210 may be located at or close to a point of contact between a user and the platform such that the vibrational forces imparted onto the body may be determined based on the force variable output of the at least one vibration sensor 210.

As described with relation to FIG. 1, by estimating the body transfer function 120 the intended orientation of the users head can be calculated. However, as stated above, the non-vibrational head tracker 220 is not suited to mitigate against the vibrational translation of the platform. The non-vibrational head tracker 220 outputs a non-predicted orientation of the user's head at a current time, i.e. an output of the orientation at the current time, rather than at the orientation at a time ahead of the current time.

The force variable is used as an input to the adaptive filter 230. The filter coefficients are based on a comparison 240 of the output of the adaptive filter 230 and output from the non-vibrational head tracker 220. The output of adaptive filter 230 provides an estimate of the body transfer function. The estimated body transfer function may be used to derive the intended orientation of the user.

In some examples the vibration sensor 210 may comprise an accelerometer. In some examples the vibration sensor 210 may comprise a velocity sensor, and the output may be differentiated to obtain an acceleration. In some examples the vibration sensor 210 may comprise a displacement sensor, and the output of the sensor may be double differentiated to obtain an acceleration. In some examples where the output of the sensor is differentiated, the differentiated output may also be filtered using a band pass filter to remove noise.

In some examples the banbass filter on the accelerometer may limit the frequency to 25 Hz. 25 Hz this is above the frequency in which significant vibration is transferred to the head and is also below half the update rate of typical systems (typically greater than 100 Hz). The lower frequency is set to a value which will depend on the exact low frequency dynamics required and typically is 1 Hz.

In some examples the adaptive filter 230 may receive a measure of the force derived from the output of the vibration sensor 210. In some examples the filter may receive a measure of acceleration derived from the output of the vibration sensor 210.

In some examples the non-vibrational head tracker 220 may comprise a gyroscopic sensor. The gyroscopic sensor may output a predicted or non-predicted orientation of the head of the user, and/or a predicted or non-predicted rate of change of orientation or pose of the user. In some examples the non-vibrational head tracker 220 may comprise a system similar to that described in WO 2017/042578 A1.

In some examples the adaptive filter 230 may comprise a recursive least squares (RLS) filter, where the constants of the RLS filter as based on the output of the comparison 240.

In some examples the comparator 240 may calculate a difference between the output of the adaptive filter 230 and the output of the non-vibrational head tracker 220.

Figure 3:
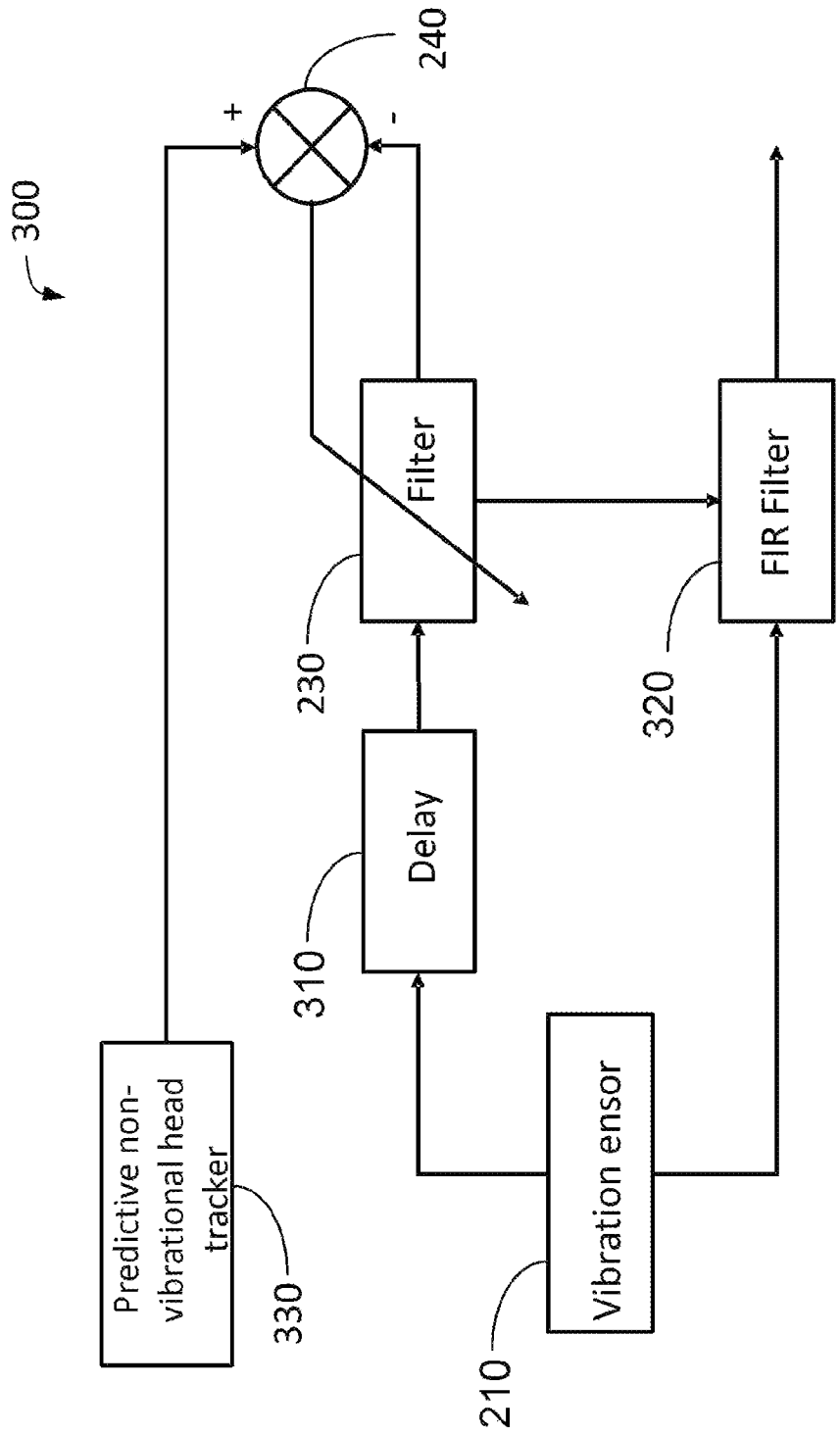
FIG. 3 shows a further example arrangement of components as may be incorporated into a tracker system according to the present disclosure.

FIG. 3 illustrates a head vibration prediction system 300 in accordance with some examples. The head vibration prediction system 300 is similar to the head tracker system 200 described with reference to FIG. 2. Similar features use the same reference signs as in FIG. 2.

Head vibration prediction system 300 comprises a vibration sensor 210, a delay 310, an adaptive filter 230, a FIR filter 320, a predictive non-vibrational head tracker 330, and a comparator 240.

Vibration sensor 210 is configured to measure vibration at a contact point of the platform to a user of the head mounted display and determine a force variable associated with the vibration. The predictive non-vibrational head tracker 330 determines a predicted orientation of the user at a predetermined prediction time ahead of the current time, and may be similar to head trackers as described in WO 2017/042578 A1.

A delay 310 substantially equal to the predetermined prediction time is added to the output of the vibration sensor 210. The delayed vibration sensor output is provided as an input to the adaptive filter 230, where the coefficients of the filter are based on the output of the comparator 240. The comparator 240 receives as inputs the output of the predictive non-vibrational head tracker 330 and the adaptive filter 230. The addition of the delay forces the adaptive filter 230 to predict the body transfer function at a time ahead of the current time.

The filter coefficients from the adaptive filter 230 are provided to the FIR filter 320, and the non-delayed output of the vibration sensor 210 is provided as input to the FIR filter 320, which provides as an output the current head vibration.

The effect of the head vibration prediction system 300 is that the adaptive filter 230 provides a prediction of the body transfer function a predetermined time ahead of the current time, that time equal to the delay 310. The filter coefficients from the adaptive filter 230 are then output to the FIR filter 320, which provides the predicted head vibration without substantial lag, as any lag is counteracted due to the fact that the adaptive filter 230 predicts the body transfer function.

In some examples a filter may be applied to the output of the vibration sensor 210 and/or the output of the predictive non-vibrational head tracker 330. The filter may be a bandpass filter. The filter may be used to remove noise which may be a result of the measurement or determination of the force at the contact point or pose/head orientation.

In some examples the adaptive filter 230 may comprise a RLS filter.

In some examples the predictive non-vibrational head tracker 330 may comprise at least on gyroscopic sensor. In some examples the predictive non-vibrational head tracker 330 may comprise a head tracker as described in WO 2017/042578 A1.

In some examples the comparator 240 may calculate a difference between the output of the adaptive filter 230 and the output of the predictive non-vibrational head tracker 330.

Figure 4:
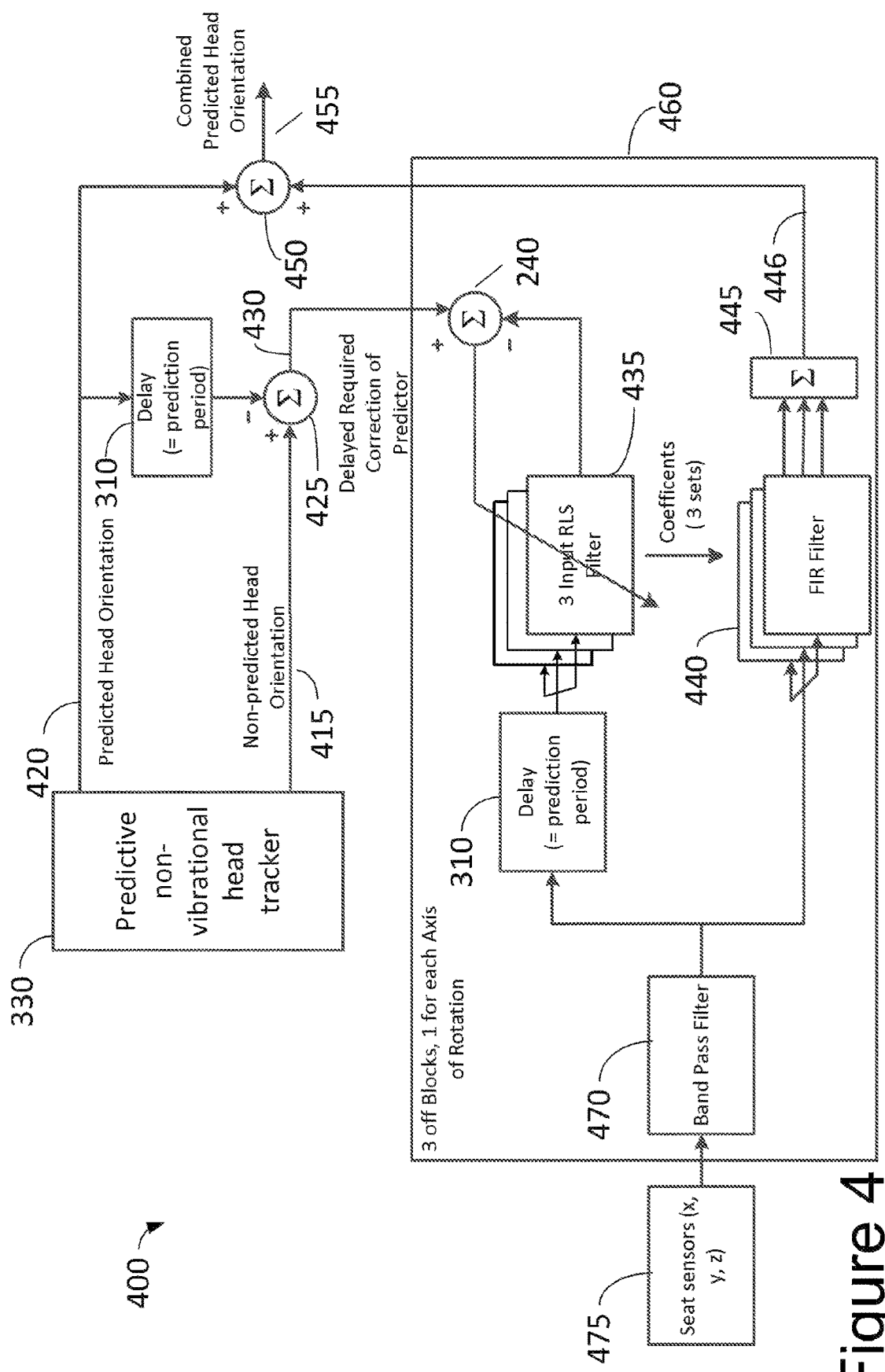
FIG. 4 illustrates a combined predicted head orientation tracker system according to the present disclosure.

FIG. 4 illustrates a combined predicted head orientation tracker system 400 in accordance with some examples. The combined predicted head orientation tracker system 400 is similar to the head vibration prediction system 300 described with reference to FIG. 3 and similar features use the same reference signs.

Combined predicted head orientation tracker system 400 comprises a predictive non-vibrational head tracker 330. Predictive non-vibrational head tracker is configured to output a predicted head orientation 420 and a non-predicted head orientation. Predicted head orientation 420 is a prediction of the head orientation a predetermined prediction time ahead of the current time. Non-predicted head orientation 415 is the head orientation obtained without the prediction.

A delay 310, equal to the predetermined prediction time, is added to the predicted head orientation 420, the delayed predicted head orientation is then compared by a comparator 425 with the non-predicted head orientation 415. As the delay 310 is equal to the prediction time, the output 430 of the comparator 425 is equal to the error of the predicted head orientation 310. The comparator 425 may find the difference between the delayed predicted head orientation and the non-predicted head orientation 415.

The head orientation may be expressed in terms of Cartesian coordinates, or for convenience with the yaw, roll, and pitch angles of aircraft may be expressed in polar coordinates.

The combined predicted head orientation tracker system 400 also comprises a plurality of seat vibration sensors 475. Each seat vibration sensor 475 is configured to determine a force variable, related to the force at the contact point between the seat and the user. The contact point may be substantially fixed in positon relative to the user, however it is to be understood that the movement of the contact point may depend on the freedom of movement of the user. Some applications require the user to more securely restrained to a seat than other applications. Furthermore, the contact point may be modelled as a point, however in practical applications the force may act over a finite area.

The seat sensors 475 may comprise a force sensor, an acceleration sensor, a velocity sensor or a position sensor.

The seat sensor 475 or associated device may be configured to convert the received information into a measure of force.

The combined predicted head orientation tracker system 400 also comprises a plurality of vibration prediction blocks 460, one vibration prediction block 460 for each axis of rotation (e.g. at least one of pitch, roll, and yaw), alternatively there may be one block 460 for each orthogonal direction/axis. Each separate vibration prediction block 460 receives force variable information from at least one of the plurality of seat vibration sensors 475 and orientation information form the predictive non-vibrational head tracker 330 as illustrated in FIG. 4.

As each vibration prediction block behaves in a similar way, it will only be described for a single vibration prediction block 460. The received force variable in three dimensions is filtered using a band pass filter 470, to remove noise from the sensor information. The filtered force variable is then delayed using delay 310, where the delay 310 is equal to the prediction period of the predictive non-vibrational head tracker 330. The delayed force variable is then provided as an input to a set of three RLS filters 435. Each RLS filter receives one of the x, y or z coordinate information (or any other orthogonal coordinates, such as polar coordinates).

The output of the three RLS filters 435 is subtracted from the output 430 of the comparator by summer 240, and the output of summer 240 is used to obtain the filter coefficients of the three RLS filters. The coefficients are then provided to a plurality of FIR filters 440, which have as inputs the filtered seat sensor output, without any delay. The output of the FIR filters 440 are then summed by summer 445 to provide a vibration correction 446.

The vibration correction 446 is then summed with the predicted head orientation 310 form the predictive non-vibrational head tracker 330 by summer 450 to obtain a combined predicted head orientation 455.

The equations below may be used to define the input and output of the filters. However, they are merely one example of equations to define the output of the filters. Other representations of rotations, such as a quaternion representation may be used.

In the following:
P=platform axes,
D=display axes,
p=predicted orientation,
np=non-predicted orientation,
t=prediction time
c=correction orientation
$[PD_n]$=orientation of the display axes in platform axes at time n The required correction in prediction orientation is given by:

$$[PD_{n-t}^p]*[PD_n^{np}]^T \quad \text{(Equation 1)}$$

where $[PD_n^{np}]$ is the non-predicted orientation and $[PD_{n-t}^p]^T$ is a delayed version of the predicted output.

For small angle rotations ($\omega_z$, $\omega_y$, $\omega_x$) around the 3 orthogonal axes, the corresponding rotation matrix can be approximated by:

$$\begin{bmatrix} 1 & \omega_z & \omega_y \\ \omega_z & 1 & -\omega_x \\ -\omega_y & \omega_x & 1 \end{bmatrix} \quad \text{(Equation 2)}$$

Thus by equating equations 1 and 2, the 'desired output' ($\omega_z$, $\omega_y$, $\omega_x$) of the 3 RLS filters can be obtained.

In the following
Ax, Ay and Az are the accelerations in the x, y and z axes;
p is the filter order, and is set to 4;
$\omega$ is the forgetting factor;
$y_i$ is the output, where i=x, y, and z denotes the output rate estimate; around the 3 orthogonal axes x, y and z; and
n is the current time index Each set of the 3 input RLS filters may have outputs $y_i$ is defined by the following:

$$x(n) = \begin{bmatrix} Ax_n \\ Ax_{n-1} \\ \vdots \\ Ax_{n-p} \\ Ay_n \\ Ay_{n-1} \\ \vdots \\ Ay_{n-p} \\ Az_n \\ Az_{n-1} \\ \vdots \\ Az_{n-p} \end{bmatrix} \quad \text{(equation 3)}$$

$$d(n) = \omega_i \quad \text{(equation 4)}$$

$$y_i(n) = w^T(n-1) \times u(n) \quad \text{(equation 5)}$$

$$e(n) = d(n) - y_i(n) \quad \text{(equation 6)}$$

$$g(n) = \frac{P(n-1)x(n)}{\varphi + x^T(n)P(n-1)x(n)} \quad \text{(equation 7)}$$

$$P(n) = \frac{P(n-1)}{\varphi} - \frac{g(n)x^T(n)P(n-1)}{\varphi} \quad \text{(equation 8)}$$

$$w(n) = w(n-1) + e(n)g(n) \quad \text{(equation 9)}$$

For small angles the corresponding rotation matrix ($[P_n^cP_n^p]$) can be obtained by equation 2, where $\omega_i$ is the output from the RLS filter ($y_i$).

The current corrected tracker prediction output is given by:

$$[P_n^cP_n^p]*[PD_n^p] \quad \text{(equation 10)}$$

A second solution, in combination with the first, may be to use head angle prediction. A known tracker system, such as that referenced above, uses gyroscopic sensors of helmet movement to provide rate data to a prediction algorithm for use in predicting helmet orientation at some future time. However, to achieve good prediction (without suffering undesirable image artefacts) the prediction time needs to be limited. Given the minimum achievable latency, further improvement is needed to the prediction algorithm in order to improve the stability of symbology. Stability of the symbols is a key factor of the performance and user acceptability criteria; symbols need to look as though they are locked to a fixed position in space irrespective of helmet movement, whether voluntary or involuntary.

It will be understood that components described above with reference to FIGS. 2-4 may in practice be implemented by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware). Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, variations and modifications not described herein, as would be apparent to a person of ordinary skill in the relevant art, may also be employed within the scope of the invention, which is defined in the claims.

the invention claimed is:

1. A method for determining an intended orientation and/or position of a user's head when the orientation of the user's head is being changed involuntarily by vibratory or buffeting forces transmitted through the user's body from a point of contact of the user's body with said forces, the method comprising:
    determining a force variable at the point of contact due to said forces;
    predicting an involuntary component of orientation of the user's head at a predetermined time due to the sensed variable, the predicting using an adaptive filter comprising an input, an output, a filter coefficient input, and at least one filter coefficient, wherein the output is equal to the involuntary component of orientation and the input comprises the force variable;
    determining, using at least one tracking system, an orientation variable of the user's head at the predetermined time;
    subtracting a first value from a second value, the first value equal to the output and the second value equal to the orientation variable, to provide a third value equal to the filter coefficient input;
    updating the at least one filter coefficient based on the filter coefficient input; and
    determining the intended orientation and/or position of a user's head based on the third value.

2. The method according to claim 1, wherein determining the force variable at the point of contact due to said forces comprises applying a band pass filter to the force variable prior predicting the output, and wherein the input comprises the filtered force variable.

3. The method according to claim 1, wherein determining, using the at least one tracking system, the orientation variable of the user's head at the predetermined time comprises applying a band pass filter to the orientation variable and the second value comprises the filtered orientation variable.

4. The method according to claim 1, wherein predicting the involuntary component of orientation of the user's head comprises time-delaying the force variable and wherein the input comprises the time-delayed force variable.

5. The method according to claim 1, wherein the input is a first input, the output is a first output, the at least one filter coefficient is an at least one first filter coefficient, the adaptive filter is a first filter, and the method further comprises:
    applying a second filter comprising a second input and a second output, and at least one second filter coefficient, wherein the second input comprises the force variable, the second output comprises the intended orientation of a user's head, and the at least one second filter coefficient is substantially equal to the at least one filter coefficient of the first filter.

6. The method according to claim 5, wherein determining, using the at least one tracking system, the orientation variable of the user's head at the predetermined time further comprises:
    using a head tracker to determine a predicted head orientation;
    applying a delay to the predicted head orientation equal to a prediction period; and
    subtracting from the orientation variable the delayed predicted head orientation to obtain a delayed corrector, wherein the second value comprises the delayed corrector.

7. The method according to claim 6 further comprising summing the predicted head orientation with the second output.

8. The method according to claim 1, wherein the force variable comprises a sensed position, sensed velocity, used to determine a force at the point of contact.

9. The method according to claim 1, wherein the user is seated upon a seat that is subject to vibratory or buffeting forces and the point of contact is the seat.

10. The method according to claim 1, wherein determining the force variable comprises sensing a rotary displacement at the point of contact.

11. The method according to claim 1, wherein determining the force variable comprises sensing a linear displacement at the point of contact.

12. The method according to claim 1, wherein predicting using the adaptive filter comprises:
    configuring the adaptive filter to model the transfer by a human body of a force from the point of contact to the user's head; and
    inputting the force variable into the configured adaptive filter thereby to determine the involuntary component of orientation of the user's head at the predetermined time.

13. The method according to claim 1, wherein the adaptive filter comprises a recursive least squares (RLS) filter defined by a plurality of coefficients.

14. The method according to claim 13, wherein predicting using the adaptive filter comprises:
configuring a finite impulse response (FIR) filter using said plurality of coefficients of the RLS filter; and
inputting, into the FIR filter, an output from the seat accelerometer thereby to determine a predicted involuntary displacement of the user's head.

15. The method according to claim 1, wherein the point of contact is substantially fixed in location relative to the user.

16. The method according to claim 1, wherein: determining the force variable at the point of contact due to said forces comprises applying a band pass filter to the force variable prior predicting the output, and wherein the input comprises the filtered force variable; and determining, using the at least one tracking system, the orientation variable of the user's head at the predetermined time comprises applying a band pass filter to the orientation variable and the second value comprises the filtered orientation variable.

17. The method according to claim 1, wherein determining, using the at least one tracking system, the orientation variable of the user's head at the predetermined time further comprises:
using a head tracker to determine a predicted head orientation;
applying a delay to the predicted head orientation equal to a prediction period; and
subtracting from the orientation variable the delayed predicted head orientation to obtain a delayed corrector, wherein the second value comprises the delayed corrector.

18. A tracker system for determining orientation of a head of a user of a head mounted display, the system comprising:
a vibration sensor configured to measure vibration at a contact point of a platform to the user and provide a vibration sensor output, the vibration sensor output including a force variable associated with the vibration;
a finite impulse response (FIR) filter configured to receive as input the vibration sensor output, and provide an output indicative of a current head vibration;
a predictive non-vibrational head tracker configured to determine a predicted orientation of the user at a predetermined prediction time ahead of the current time;
an adaptive filter configured to receive as input a delayed version of the vibration sensor output, and to provide filter coefficients to the FIR filter; and
a comparator having a first input to receive an output of the predictive non-vibrational head tracker, and a second input to receive an output of the adaptive filter;
wherein one or more coefficients of the adaptive filter are based on an output of the comparator.

19. The tracker system of claim 18, wherein the adaptive filter provides a prediction of a body transfer function to be used to derive an intended orientation of the user.

20. The tracker system of claim 18, further comprising
a bandpass filter configured to remove noise from the vibration sensor output.

21. A tracker system for determining an orientation of a head of a user of a head mounted display, the system comprising:
a vibration sensor configured to measure vibration at a contact point of a platform to the user and provide a vibration sensor output, the vibration sensor output including a force variable associated with the vibration;
a finite impulse response (FIR) filter configured to receive as input the vibration sensor output, and provide an output indicative of a current head vibration;
a predictive non-vibrational head tracker configured to determine a predicted head orientation of the user at a predetermined prediction time ahead of the current time by
using a head tracker to determine the predicted head orientation;
applying a delay to the predicted head orientation equal to a prediction period; and
subtracting from the predicted head orientation the delayed predicted head orientation to obtain a delayed corrector, wherein an output of the predictive non-vibrational head tracker comprises the delayed corrector;
an adaptive filter configured to receive as input a delayed version of the vibration sensor output, and to provide filter coefficients to the FIR filter;
a comparator having a first input to receive the output of the predictive non-vibrational head tracker, and a second input to receive an output of the adaptive filter, wherein one or more coefficients of the adaptive filter are based on an output of the comparator; and
a summer configured to sum the output indicative of a current head vibration with the predicted head orientation to obtain the orientation of the head of the user.

* * * * *